(12) United States Patent
Wolzien

(10) Patent No.: US 7,769,743 B2
(45) Date of Patent: Aug. 3, 2010

(54) SYSTEM AND METHOD FOR AUTOMATED SELECTION AND DISTRIBUTION OF MEDIA CONTENT

(76) Inventor: Thomas R. Wolzien, 91 River Rd., Grandview-On-Hudson, NY (US) 10960

( * ) Notice: Subject to any disclaimer, the term of this patent is extended or adjusted under 35 U.S.C. 154(b) by 405 days.

(21) Appl. No.: 11/808,983

(22) Filed: Jun. 14, 2007

(65) Prior Publication Data

US 2008/0313169 A1    Dec. 18, 2008

(51) Int. Cl.
*G06F 7/00* (2006.01)
(52) U.S. Cl. .................................. 707/709; 707/770
(58) Field of Classification Search .............. 707/1, 707/6–7, 10, 999.001, 999.006–999.007, 707/999.01
See application file for complete search history.

(56) References Cited

U.S. PATENT DOCUMENTS

| | | | |
|---|---|---|---|
| 6,629,081 B1* | 9/2003 | Cornelius et al. | 705/30 |
| 6,957,186 B1* | 10/2005 | Guheen et al. | 705/1.1 |
| 7,315,826 B1* | 1/2008 | Guheen et al. | 705/7 |
| 2004/0068532 A1* | 4/2004 | Dewing et al. | 709/200 |
| 2006/0287916 A1* | 12/2006 | Starr et al. | 705/14 |
| 2007/0050382 A1* | 3/2007 | Bugir et al. | 707/100 |
| 2007/0078714 A1* | 4/2007 | Ott et al. | 705/14 |
| 2007/0130015 A1* | 6/2007 | Starr et al. | 705/14 |
| 2008/0015877 A1* | 1/2008 | McKenna et al. | 705/1 |
| 2008/0040354 A1* | 2/2008 | Ray et al. | 707/10 |
| 2008/0086750 A1* | 4/2008 | Yasrebi et al. | 725/86 |
| 2008/0109306 A1* | 5/2008 | Maigret et al. | 705/14 |
| 2008/0195664 A1* | 8/2008 | Maharajh et al. | 707/104.1 |
| 2008/0200154 A1* | 8/2008 | Maharajh et al. | 455/414.3 |
| 2008/0201386 A1* | 8/2008 | Maharajh et al. | 707/201 |
| 2008/0207182 A1* | 8/2008 | Maharajh et al. | 455/414.1 |

FOREIGN PATENT DOCUMENTS

| | | |
|---|---|---|
| JP | 2000-078559 A | 3/2000 |
| JP | 2003-067414 A | 3/2003 |
| JP | 2007-012091 A | 1/2007 |
| KR | 102003039826 A | 5/2003 |

OTHER PUBLICATIONS

Ribeiro et al.—"A multimedia database workbench for content and context retrieval"—Multimedia Sinal Processing, 2004 IEEE 6th workshop—Sep. 29-Oct. 1, 2004 (pp. 430-433).*
Marrin et al.—"Steerable Media: Interactive television via video synthesis"—Virtual reality modeling language symposium—ACM—2001 (pp. 7-14).*

* cited by examiner

*Primary Examiner*—Jean Bolte Fleurantin
*Assistant Examiner*—Anh Ly
(74) *Attorney, Agent, or Firm*—Steptoe & Johnson LLP

(57) ABSTRACT

A media management system for and method of increasing value of media content are provided wherein content attributes associated with media content are stored, a target entry list is generated, and a resultant scenario calculated with an associated financial figure.

10 Claims, 14 Drawing Sheets

| Content/Source | Form | Distribution | Market | Demographics | Geographics |
|---|---|---|---|---|---|
| Animation/Fun Games | Graphics<br>Audio<br>Video | DVD<br>CD<br>Internet<br>Television<br>Cable TV<br>Magazine<br>Newspaper<br>Cell Phones | Entertainment<br>Education | Children (A)<br>Women 18-50 (B)<br>Men 18-50 (C)<br>Parents (D)<br>Income 40,000+ (E)<br>High School+ (F) | Atlanta, GA<br>National<br>Global |

FIG. 6

Offering 1: Car Related Material Targeting Men 18-34

|  | TV Company 1 | TV Company 2 | Web Business 1 | Web Business 2 | Radio Company 1 | Magazine Group 1 | Magazine Group 2 | Education Pub Group 1 | Educational Pub Group 2 | Cell Phone Provider 1 | Cell Phone Provider 2 |
|---|---|---|---|---|---|---|---|---|---|---|---|
| Video Audio Package | 200 | 250 | 100 | 125 |  |  |  |  |  | 300 Cell Phone Exclusive Contract | 250 NA |
| Audio only |  |  |  |  |  |  |  |  |  |  |  |
| Video |  |  | 25 | 35 | 35 |  |  |  |  |  |  |
| Natural Sound | 50 | 25 | 35 | 50 |  |  |  |  |  |  |  |
| Text |  |  |  |  |  |  |  |  |  |  |  |
| Package |  |  | 75 | 100 |  | 200 | 50 | 75 |  | 25 |  |
| Text Element |  |  | 25 | 15 |  |  |  |  |  | 15 |  |
| Still Photograph |  |  | 50 | 65 |  | 100 | 150 |  |  | 50 | 25 |
| Map |  |  | 25 | 15 |  |  |  |  |  | 15 | 25 |

Offering 2: Health Care Related Material Targeting Women 25-54

|  | TV Company 1 | TV Company 2 | Web Business 1 | Web Business 2 | Radio Company 1 | Magazine Group 1 | Magazine Group 2 | Education Pub Group 1 | Educational Pub Group 2 | Cell Phone Provider 1 | Cell Phone Provider 2 |
|---|---|---|---|---|---|---|---|---|---|---|---|
| Video Audio Package |  | 250 | 135 Web Exclusive Contract | NA |  |  |  |  |  | 300 | 250 |
| Audio only |  |  |  |  |  |  |  |  |  |  |  |
| Video |  |  | 50 | 65 | 150 |  |  |  |  | 35 | 25 |
| Natural Sound |  | 25 | 15 | 15 |  |  |  |  |  | 15 | 15 |
| Text |  |  |  |  |  |  |  |  |  |  |  |
| Package | 25 |  | 100 | 25 |  | 50 | 200 |  |  | 25 | 25 |
| Text Element |  |  |  |  |  | 10 | 75 |  |  |  | 10 |
| Still Photograph |  |  | 100 | 75 |  | 100 | 150 |  |  | 15 | 50 |
| Map |  |  |  |  |  |  |  |  |  |  |  |

FIG. 10

Input    (Note: From Business Model)
        Media Arrives for Input
        Accession Information Added Accession Number
                Date Completed
                Date of First Release (If any)
                Title
                Primary Topic (From Topic List)
                Second Topic
                Third Topic
                Fourth Topic
                Description Primary Location
                Secondary Location Content Type
                Video Silent or Natural Sound
                Video With Voice Track
                Audio Only
                Text
                Still Photos
                Graphics Content Package
                Completed Product (Book, TV Show)
                Completed Component (News Story, Ed Chapter)
                Element (Photo, Paragraph, Map)

Language

First Place of Use
                Television
                Radio
                Internet/Online
                Books
                Newspaper
                Magazine
                Motion Picture
                Audio
                Cell Phone

FIG. 12A

First Performance Statistics
Audience/Unit Sales
Revenue
Cost to Produce
Demographics of Audience/Purchasers
Pretax Earnings Categorization of Likely Audience
Sex
Age
Business/Personal Use
Income Level
Ethnicity
Education Level
Religion
Location

FIG. 12B

SYSTEM AND METHOD FOR AUTOMATED SELECTION AND DISTRIBUTION OF MEDIA CONTENT

BACKGROUND OF THE RELATED ART

1. Field of Invention

This invention generally relates to the field of media and content selection and distribution. More specifically, embodiments of this invention relate to systems and methods to identify, categorize, evaluate, package and distribute content so as to increase (and preferably maximize) value for entities such as those who own or control the content.

2. Background

A common feature of most successful media businesses is the ability to select and distribute content in a manner that increases (and preferably maximizes) its value uses, including initial releases of stand alone products (such as a movie, a book, or a TV show) and in subsequent, ancillary uses of both stand alone products and component parts thereof (e.g., photographs, segments, scenes, chapters, articles, paragraphs, songs, etc.).

Historically, media businesses distributed content by way of conventional media organizations "old media" through print, broadcast and cable television, and motion pictures, in part because content options were also limited primarily to print, television programming and motion pictures. Today, however, content may exist in many forms including text, graphics, animations, computer developed animations, 3D, still frames, computer programs, film, electronic video, electronic audio, and combinations of the above. There has been a similar explosion in the options for distribution (and display) of media. Nevertheless, media organizations still rely primarily on conventional legacy operations such as television networks, broadcast stations, cable networks, and other platforms to distribute content to consumers. This is due in part to the difficulty in deciding how to commit resources among literally thousands or tens of thousands of content items and millions of component parts, and the rapidly increasing number delivery platform options including those related to the internet, mobile phones, and handheld devices. In this manner, content is either inefficiently distributed or wasting in archives because businesses which control content find it difficult to match the content in inventory with the consumers who are most interested in that content, and then to deliver that content through the most value enhancing distribution vehicle(s).

Therefore, there is a need to efficiently, conveniently and relatively quickly allow for the identification, packaging, targeting and distribution of content.

BRIEF SUMMARY OF EXEMPLARY EMBODIMENTS

Various embodiments of the present invention are directed to systems and methods for identifying, packaging and evaluation of content resources for the purpose of increasing (and preferably maximizing) the value of the content across distribution, talent, production, packaging, consumer profiles, geographic areas and market sector (news, information, financed, entertainment, sports, education, etc.).

In particular, an embodiment of the present invention provides a storage device that stores a media asset database containing one or more content data entries associated with one or more variables within categories such as content type, source, distribution media, market, geography of use, consumer demographics and preferences, and topic, as examples.

An associated process may determine the highest value uses for a particular piece or subset of identified data according to one or more financial metrics. Once these uses are determined, the preferred attributes in the database for each data entry are flagged with preference flags which can be changed as market conditions evolve. These preference flags are a way of linking elements of various categories in the database to one another. For example, it may be determined that value can be maximized for a short health story previously covered and prepared by a reporter in audio video format and/or played in a particular television market. By way of the present embodiment, this short health story could also be targeted to middle age women, and distributed nationally over internet, cellular telephones, and/or syndicated to local broadcast television stations in other markets. These preferences can be determined in part based on financial estimates for the short clip for one or more of the selected variables.

According to another embodiment, a user is able to enter via a user device and interface, a database identifying the extensive inventory of content and content producing resources within an organization. Preferably, this is done by starting with the identity of a known piece of content. Alternatively, a user may access the database and search for content according to search parameters such as media type, format, genre, amongst other things. In either case, once the content is identified, a media management component (MMC) having a controller which receives the content identifier or prospective content descriptor via a communications interface. The MMC controller, operably in communications with the storage device, then searches among the entries in the media asset database for potential predetermined categories such as those described above. In a first phase of the process, for example, the database may identify that for an inventoried piece of content, the content owner, etc.

In other embodiments, an optimizer and/or rule set are provided for matching media content to value-creating distribution methods. Preferably, the Optimizer determines the highest value-creating distribution method. The Optimizer may, for example, utilize a dynamic set of rules adjusted based on bids received for media content from various distributors. Other conditions are also contemplated.

Further features of the present invention, as well as the structure and operation of various embodiments of the present invention are described in detail below with reference to the accompanying drawings.

BRIEF DESCRIPTION OF THE DRAWINGS

The accompanying drawings, which are incorporated herein and form part of the specification, illustrate embodiments of the present invention and together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 6 is a table showing sample attributes in the database according to an embodiment of the present invention;

FIG. 10 provides illustrations of examples of how a rule based system and Optimizer could work under certain conditions according to an embodiment of the present invention;

FIGS. 12A & 12B show information that may be added to facilitate one or more of the processing functions described in embodiments of the present invention.

DETAILED DESCRIPTION OF EXEMPLARY EMBODIMENTS

1. Overview of Exemplary Embodiments of the Invention

Embodiments of the present invention are directed to a system, method, and computer program product for enabling users to combine analytical information with specifically designated content in inventory as collected and stored in a database. Embodiments of the invention provide a guide to the potential value of exploiting content across various media distribution methods and vehicles. For example, particular media content that has previously been distributed over one set of distribution paths may be determined to provide incremental value when distributed on other distribution paths. The user may then use the results to distribute the particular content using voice, email, internet, print media or television options, for example, through one way or two way distribution means including print magazines or newspapers, wired or wireless telephone systems, wired or unwired broadband systems, cable or DBS distribution systems, broadcast video, audio, or data systems, amongst others. Other embodiments disclose management and evaluation tools for sorting and ranking revenue opportunities from various media and population groups, and using rule-based methods to automate sorting, preparation, and distribution.

2. Exemplary Structural Environment

Figure 1:
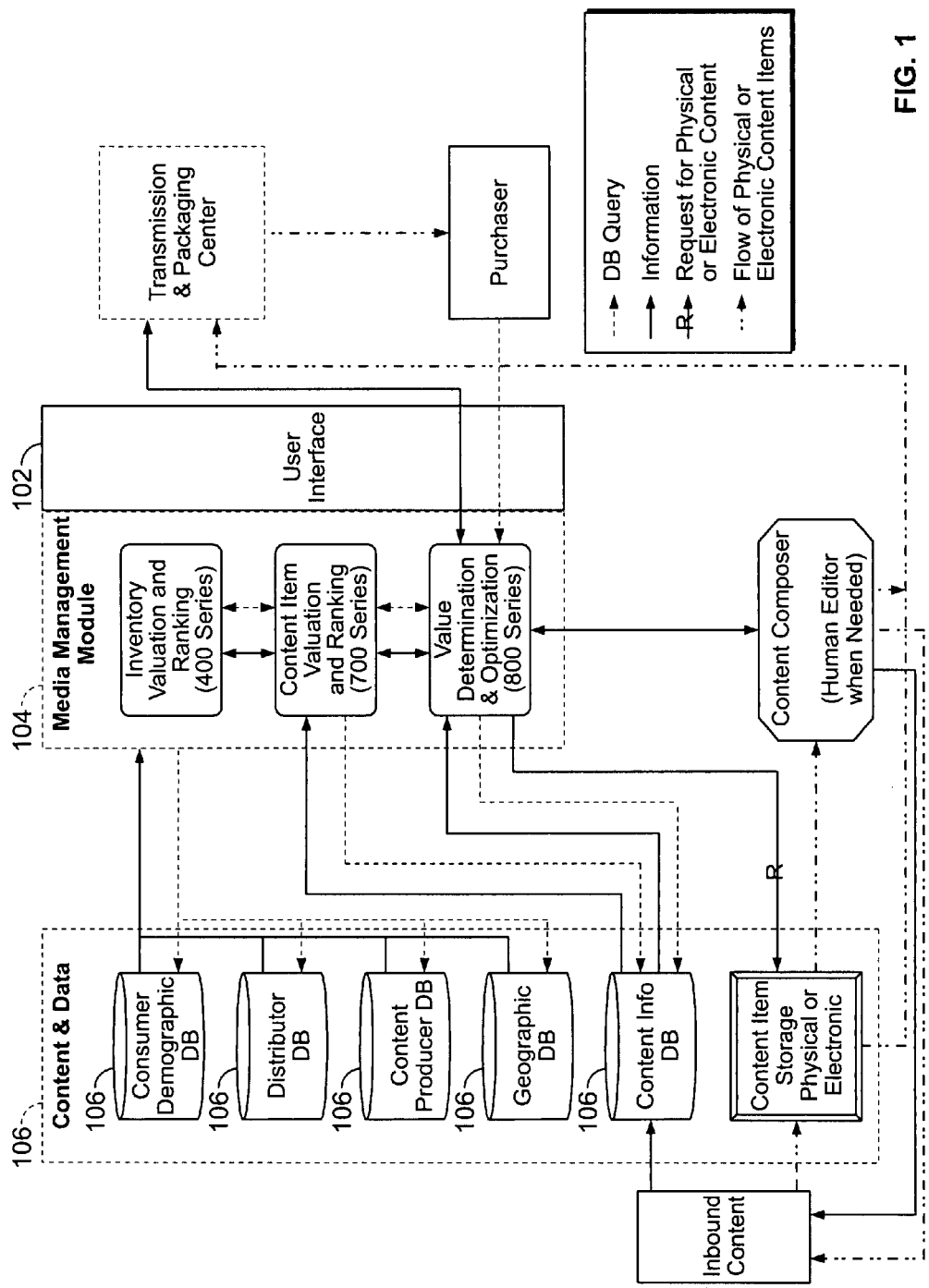
FIG. 1 is a high level block diagram of the media management system according to an embodiment of the present invention.

Referring initially to FIG. 1, a media management system 100 will now be described according to embodiments of the present invention. The invention, however, is not limited to these exemplary embodiments. Other implementations of the media management system 100 will be apparent to persons skilled in the relevant arts based at least in part on the teachings contained herein.

2.1 Media Management System

FIG. 1 is a high level block diagram of the media management system 100. The system 100 includes a media database 106. The media database contains one or more content tables of inventory. The content tables contain entries indicating attributes associated with a piece of content. Such entries may include information identifying content type, content ID, size, ratings, genre, location, electronic format, owner, any restrictions on use including various union, performance, and ownership rights, and distribution history (if any). Further, there may be preference flags which are used to link attributes in the content tables with attributes in other categories.

The same media database 106, or alternatively a separate database, may contain tables of one or more content producing resources in the database. Content producing resources may include television networks, television and movie studios, television stations, radio stations, newspaper organizations, computer animators, magazine publishers, book publishers, and online content and program providers. The content producing tables may contain attributes associated with each content producing resource. Such attributes may include information identifying performance ratings, revenues from advertising, subscription and unit sales, cost factors, viewership and sales statistics, financial performance, target audience, amongst other things. Further, there may be preference flags which are used to link attributes in the content producing tables with attributes in other categories.

The media database, or alternatively a separate database, may contain tables of one or more potential distribution forms. Exemplary distribution forms include cable, satellite, telco, radio broadcast, television broadcast, wireless, cell phone, internet, intranet, packaged goods, and newspaper, or other print publications. The distribution tables may contain attributes associated with each distribution form. Such attributes may include cost and rate information, viewership information, financial performance, amongst other things. Further, there may be preference flags which are used to link attributes in the distribution tables with attributes in other categories.

The media database, or alternatively a separate database, may include stored demographics sectors of interest. Demographics that may be stored in the database may include age, sex, income, buying habits, media viewing habits, amongst other things. Further, there may be preference flags which are used to link attributes in the demographic tables with attributes in other categories.

The media database, or alternatively a separate database, may include stored geographic locations of interest. Attributes that may be stored with designated geographies may include viewership metrics, buying habits and demographics of a region, amongst other things. Further, there may be preference flags which are used to link attributes in the geographic tables with attributes in other categories.

Further, the media database may be a relational database with cross links between various identified entries. These cross links may be effectuated by using the preference flags described above. For example, a particular geographic region may have cross links to the demographics tables indicating prevalent sex, age, buying habits, etc., for the particular geographic region. The geographic region entries may also have links to the distribution forms available within that particular region. For example, a rural region may only receive satellite access.

The media management system 100 also preferably includes a user interface 102. User interface 102 provides interaction between a user and inventory in the media management system 100. In particular, user interface 102 allows a user to access the functionality of the media management module 104. Further, the user interface 102 allows the user to enter database search input information or respond to queries.

The user input is preferably received at the media management module 104. Media management module 104 may contain processor controlled computer software routines used in implementing the processes of the present invention and accessing information from the media asset database 106 and performing the calculations and analysis described herein.

As will be described further below, users may access and traverse the functions provided by the media management module 104 in any number of ways via interaction with menus, voice recognition or clicking on icons or depressing keys provided by the user interface 102. Other ways of accessing media management module 104 will be apparent to persons skilled in the relevant arts based at least on the teachings contained herein.

2.2 Computer System Embodiment

Figure 2:
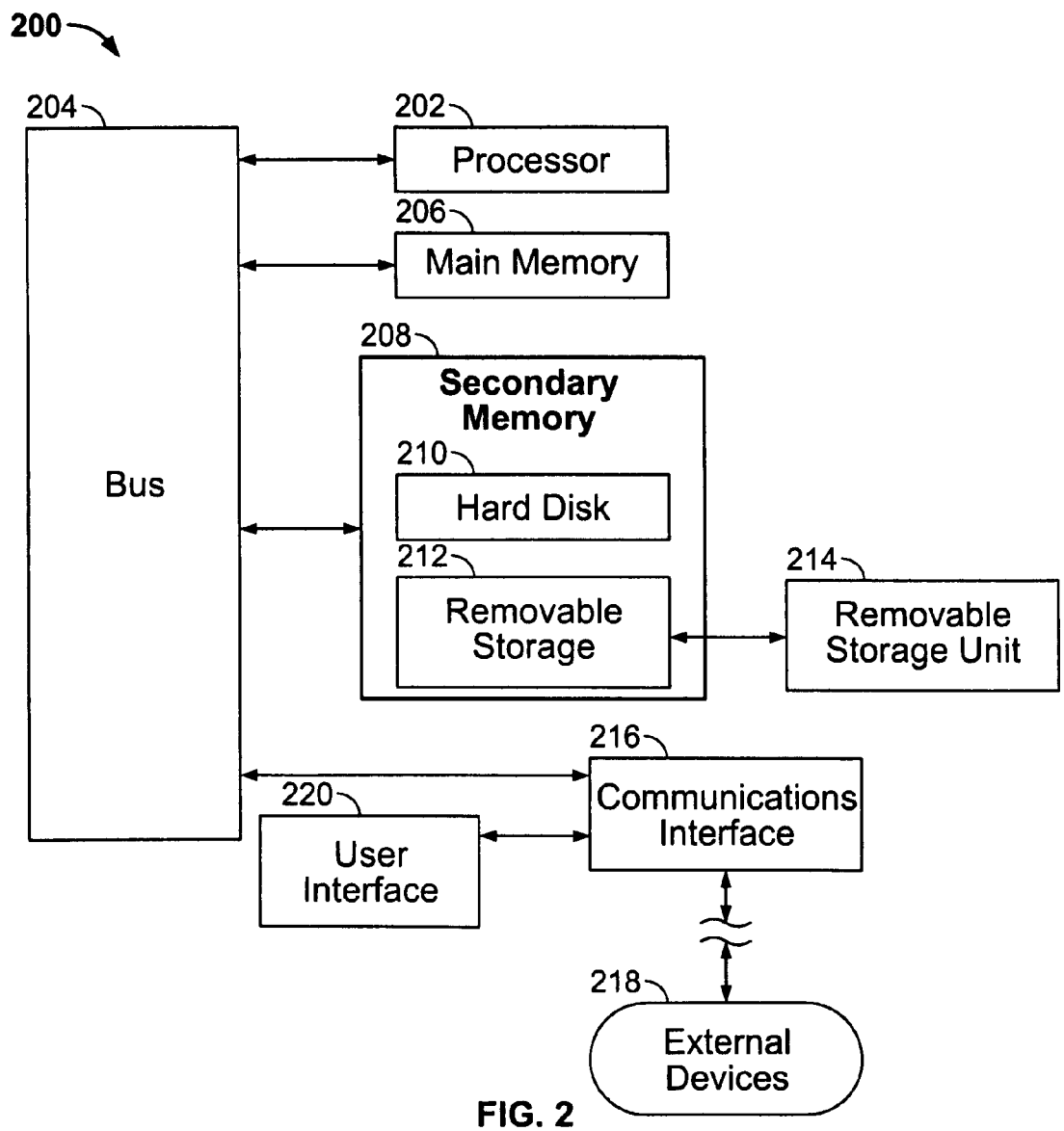
FIG. 2 is a block diagram of a general purpose computer system according to an embodiment of the present invention.

In one embodiment, the components of the media management system 100, shown in FIG. 1, can be implemented in whole or in part using a conventional computer system 200, the components of which are shown in FIG. 2. The conventional computer system 200 could be, for example, a conventional personal computer, a personal data assistant, wireless phone, mobile device, cable or satellite set top box or electronic tablet or combinations of any of the above operably in communications with one another.

The computer system 200 preferably includes one or more processors 202 connected to a communication bus 204. The computer system 200 also may include a main memory 206. Main memory 206 may be random access memory (RAM), read only memory (ROM), EPROM, and/or EEPROM. Computer system 200 further includes secondary memory 208. Secondary memory 208 includes, for example, hard disk drive 210 and/or removable storage drive 212. Removable storage drive 212 could be, for example, a floppy disk drive, a magnetic tape drive, a compact disk drive, a digital video disc drive, a program cartridge and cartridge interface, or a removable memory chip. Removable storage drive 212 reads from and writes to a removable storage unit 214. Removable storage unit 214, also called a program storage device or computer program product, represents a floppy disk, magnetic tape, compact disk, or other data storage device.

Computer programs or computer control logic can be stored in main memory 206 and/or secondary memory 208. Thus, for example, the media management module (MMM) routines may be stored in either main memory 206 and/or the secondary memory 208. Preferably, processor 202 of other controller in the general purpose computer may operate as the MMM controller. Further, the media asset database 106, which contains the media attribute tables, could be implemented in main memory 206 or secondary memory 208.

Computer system 200 further may include a communications interface 216. Communications interface 216 enables the computer system 200 to send and receive software and data to/from external devices 218. Information may be communicated from the communications interface 216 over any transmission known in the art including wireless or wireline networks, cable distribution back channels, online information networks, Internet, Intranet or any other transmission means known in the art. Examples of communications interface 216 include a modem, a network interface, and a communications port.

As discussed above, the media management system 100 may be centralized in a single computer system 200 with the media management module containing processor 202 controlled programs residing in memory 206, 208 or 218.

Referring again to FIG. 2, the user interface 220 may be a keyboard, remote controller device, personal data assistant, cell phone punch pad, a microphone and voice recognition system, or any other conventional means to enter data. The user interface 220 may connect directly to the general purpose computer 200 of to an external device 218, as shown in FIG. 2.

Figure 3:
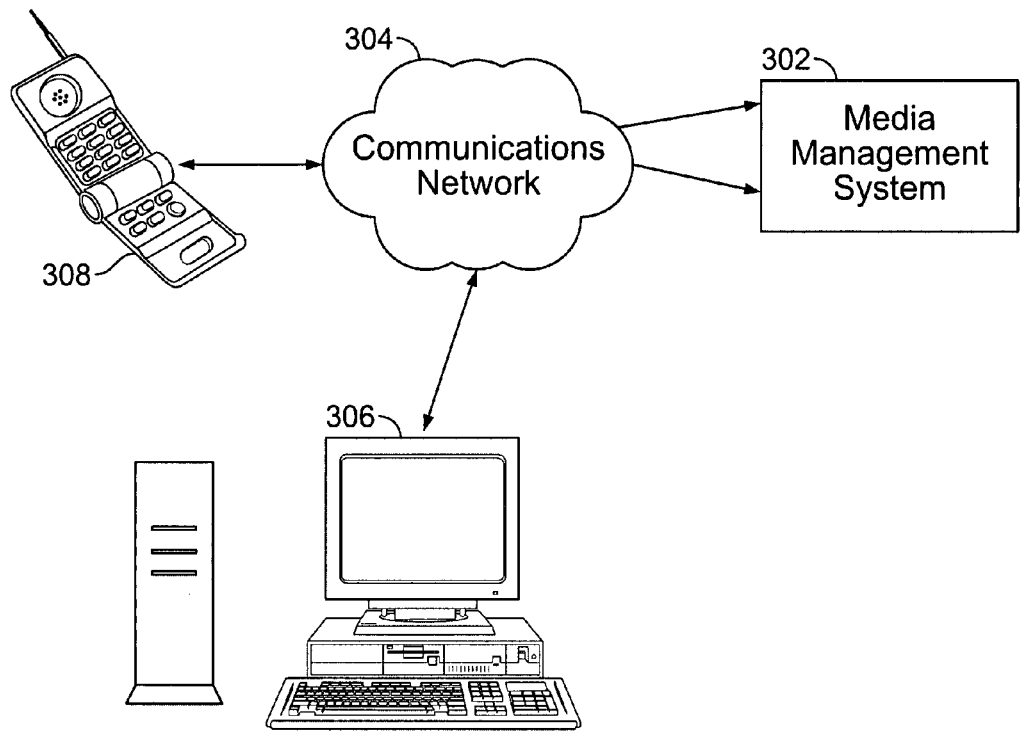
FIG. 3 is an illustration depicting a media management system using a client server architecture according to an embodiment of the present invention.

In other embodiments, the media management system 100 is distributed among multiple computer networked systems, examples of which are shown in FIG. 3, as explained in further detail below. The degree of centralization or distribution is implementation and/or application dependent.

For example, consider FIG. 3 which illustrates an embodiment of the present invention with a media management module. In this embodiment, the media management module (MMM) 104 containing, or connected to a server storing, the media asset database 106 (see FIG. 1) could reside in host computer 302. A user accesses media management module 104 over communications network 304 using user interface 220, depicted in the example as a general purpose computer 306. In other words, as with FIG. 2, the user interface 102 in FIG. 3 may be the computer 306 or partially or wholly implemented via keyboard, remote controller device, personal data assistant, cell phone punch pad, a microphone and voice recognition system. or any other conventional means to enter data. Of course, the user interface 102 may alternatively be a personal data assistant, wireless phone, mobile device, cable or satellite set top box or electronic tablet in this embodiment acting alone or in combination with host computer 302. Communications network 304 may be wireless or wireline networks, mobile networks, cable or satellite distribution back channels, online information networks, Internet, Intranet or any other transmission means known in the art.

Alternatively, the routines and functions of the media management module 104 could be implemented solely within the terminal 306 or shared between the terminal 306 and the host computer 302 in a client/server relationship. For example, the user may enter prospective consumer target identifiers via user interface into the computer terminal 306. The media management module (MMM) 104 preferably formats and sends the user input and a request via communications network 304 to the host computer 302. At the host computer 302, the host computer controller component of the media management module 104 receives and processes the request from the terminal 306. Under processor control, the module 104 searches the media asset database 105 stored in either local or remote storage according to the processes described below. The module 104 includes a search engine for performing the searches, evaluation and calculations described herein. The results preferably communicated back to the terminal 306 and displayed or printed out to the user. For example. the results may include tables showing scenarios with selected content with distribution form, a demographic sector, and a geography of interest with projected revenue. Content may be ranked according to any metric including revenue. These resultant tables may be used to make content and programming decisions by management.

Figure 4:
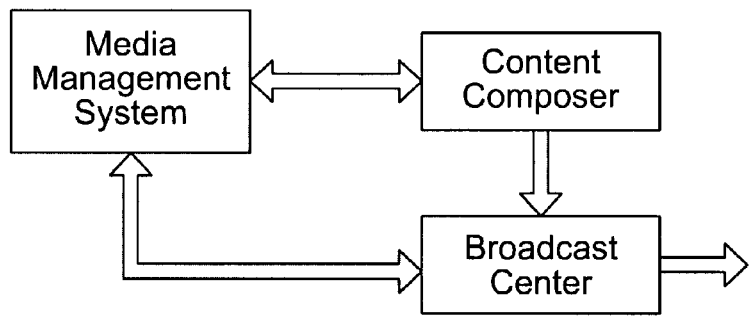
FIG. 4 is a block diagram of a system for composing and broadcasting content selections from a media management system according to an embodiment of the present invention.

Referring to FIG. 4, a content composer is disclosed for assisting in the process of facilitating content selection and distribution by integrating content of high value, as determined by the media management system, into program streams or otherwise making selected programs available to either broadcast centers or websites. The content composer may consist of computer communications hardware and/or software. The content composes package and may reformat content into whatever format is necessary for the selected distribution media. The content composer delivers the content to the broadcast center. The broadcast center output will be in whatever format necessary for the particular distribution platform. Such formats may include MP3, MPEG-2, MPEG-3, TCP/IP, broadcast streaming, analog formats, html, or any other conventional Industry standard format. This content can be packaged and delivered over any distribution medium including online information networks, Internet, Intranet, broadcast and cable TV, and wireless networks, wired networks, and/or physical delivery. Receivers of the content may include PCs, TV's, web tablets, cell phones, set top boxes, ITV devices, audio/video players, and the like.

The program producers may use the content composer to create content for delivery. The content can be transferred to memory in the content composer or delivered directly to the broadcast center based on direction and control by the content composer. Working with the content composer, producers may pull selected ads from the media management system and link such ads into complete programs, then electronically transfer the programs to the broadcast center. Users may be able to compose their own programs via an Internet enabled device. Their program instructions are received by the content composer, where their choices are linked into the desired program.

In a preferred embodiment, producers may receive the results of the search from the media management system. Using the user interface with an appropriate navigator GUI, they may use the resultant search tables to search for currently available programs. Resulting tables are hosted on a website (or similar hosting platform) in the media management system and are dynamically updatable from data in the database. When a program is cleared for broadcast, the broadcast center checks lists of subscribers to determine who is authorized to receive a program according to known DRM programs and methods.

Further, program play statistics and viewer usage with associated demographics may be passed from the broadcast center to the media management system. The media management may use this "real world" data to update the tables and attributes in the database.

3. Operation

3.1 Stages

Figure 5:
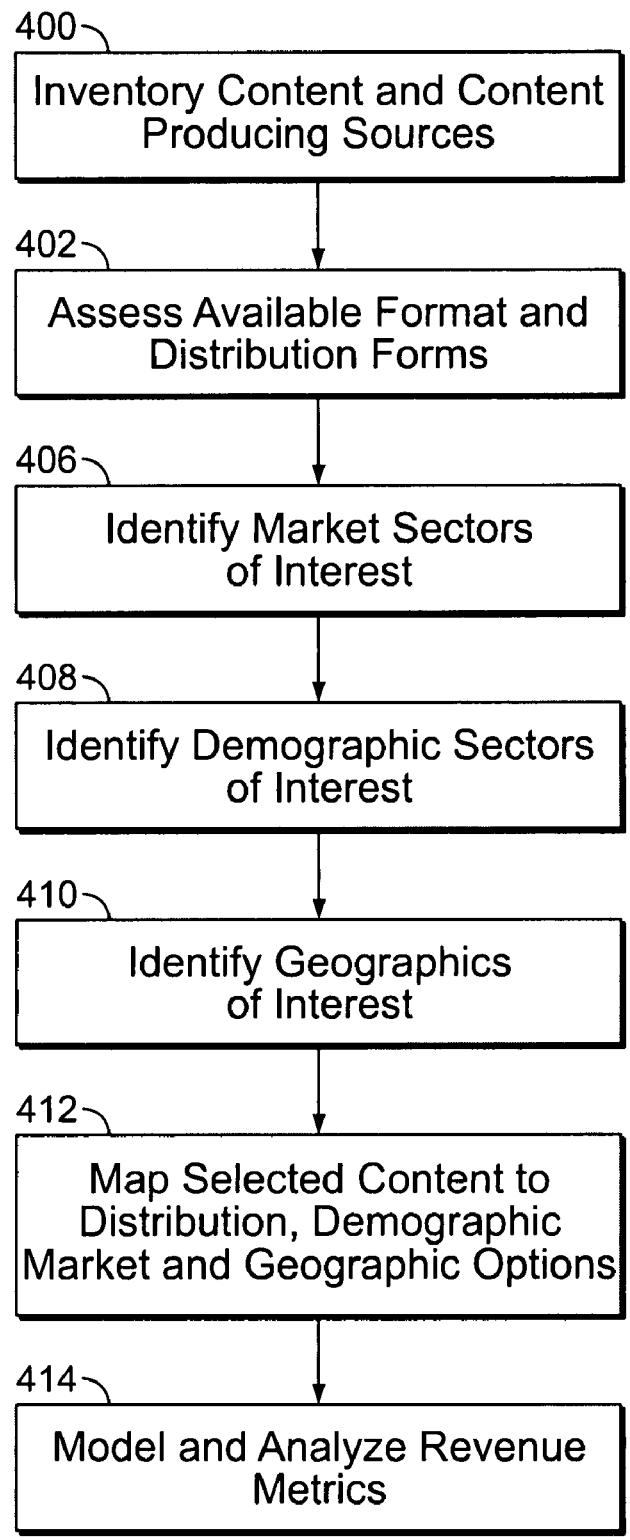
FIG. 5 shows a flow chart illustrating the steps of the system according to an embodiment of the present invention.

Referring to FIG. 5, one method of the present invention is disclosed. In step 400, content and the content producing sources are identified and loaded into the media asset database 106. For example, step 400 tells us there is a children's cartoon designer associated with the FUNGAMES graphics studio who does animation. Next, in step 402, available formats and distribution forms are designated preferably by linking preference flags associated with the animation content to possible for a and distribution alternatives. Referring to the example, identified cross referenced formats may be graphics, audio and video. Further, through the use of preference flags, it may be determined at this stage that certain content is inappropriate for whatever reason for certain distribution forms. For example, available distribution forms may include television, DVD, CD, Television, Internet, cable TV, Magazine and newspapers.

In step 406, market sectors of interest are determined by the program. For example, step 406 may identify entertainment and education as potential markets. Again, this is preferably done by cross referencing the content type and/or source with the markets. In steps 408 and 410, demographics sectors and geographies of interest are identified in the same manner, respectively. Referring again to our example, this step may identify potentially desirable demographics as Children, Women 18-50, Men 18-50, Parents, Income 40,000+, and High School Education+. With respect to geography, geography options include Atlanta, Ga., Global, and National.

In step 412, the selected content is mapped and linked to particular distribution. demographic, market and geographic options. This linking results in potential content scenarios. Referring to FIG. 6, potential scenarios are defined for the content.

Once all (or a relevant subset) of the reasonable options are identified, these options are input into the model for analyzing such options against revenue and cost metrics in step 414.

FIG. 6 shows steps involved in associating revenue and cost data with the various phases to provide a tool for assessing potential value. Each attribute in FIG. 6 will preferably have some value associated with it. These values are preferably not all static, but vary based on links to attributes in the other categories. For example, the attributes in distribution and market are provided with some monetary value. Each of the demographic attributes is associated with a percentage of interest. This percentage of interest for each attribute differs based on form, distribution medium, market and/or geography. Within each designated medium (television, magazines, newspapers, cell phones, etc.), revenue estimates are made as a function of the demographic information subgroup, for example.

Figure 7:
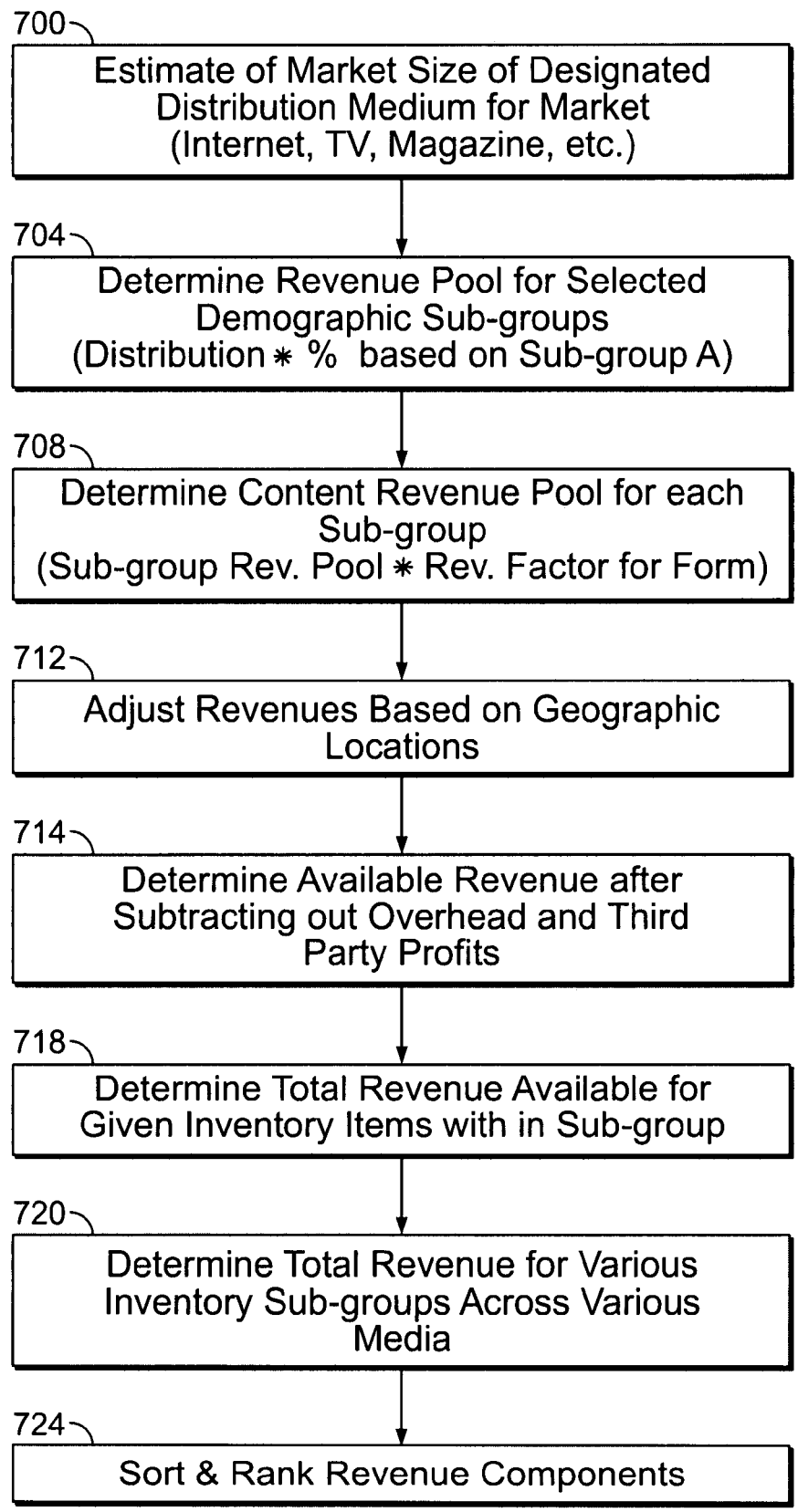
FIG. 7 shows a flow chart illustrating steps of the system according to an embodiment of the present invention.

FIG. 7 shows the steps of a model for attributing monetary value to each scenario of interest. In step 700, revenue estimates of market size are made and stored in the database. For example, the illustrative market size for magazines in the entertainment market may be fourteen billion and for television, 85 billion. In step 704, the distribution/market size is multiplied against each of the selected demographic categories, which are designated sub-groups for convenience. Thus, the result of the calculation will be the Revenue % based on population subgroup x, which equals Revenue Pool for subgroup.

In step 708, each Revenue pool for sub-group is then multiplied by the revenue factor associated with each form of content (i.e., graphics, audio, video, etc.). The result is termed the Content Revenue Pool for each Sub-Group. Next, the resulting Revenues are multiplied by a factor representing each geographic market. Thus, for example, referring again to FIG. 6, revenue values are determined across the geographic locations of Atlanta, Ga., National, and Global.

In step 712, the total revenue across all sub-groups is adjusted by geographic location factors. Each of these revenue values are then reduced by direct and indirect expenses, such as overhead, etc., in step 714. Further, profit for producers, ad agencies, marketing, and/or distributors is also subtracted from the revenues in step 716.

Next, Total Revenue is determined for selected Inventory Items within sub-groups in step 718. For example, the total number of items meeting the desired search criteria can be multiplied by the amount of (actual or projected) revenue determined to be available for each piece of content meeting the desired search criteria. As an example, the piece of content may be a self contained video/audio presentation regarding health issues of specific interest to women 18-49 years old. In step 720, total revenue is determined for various subgroups across various media.

Finally, in step 724, revenue is ranked and sorted according to any methodology. For example, revenue for attributes can be ranked across any market or distribution medium.

One of skill in the art will appreciate, however, the invention is not limited to these example embodiments. Other implementations of the sales and marketing campaign management system 100 will be apparent to persons skilled in the relevant arts based at least in part on the teachings contained herein.

3.0 Exemplary Search Operation of the Invention

Figure 8:
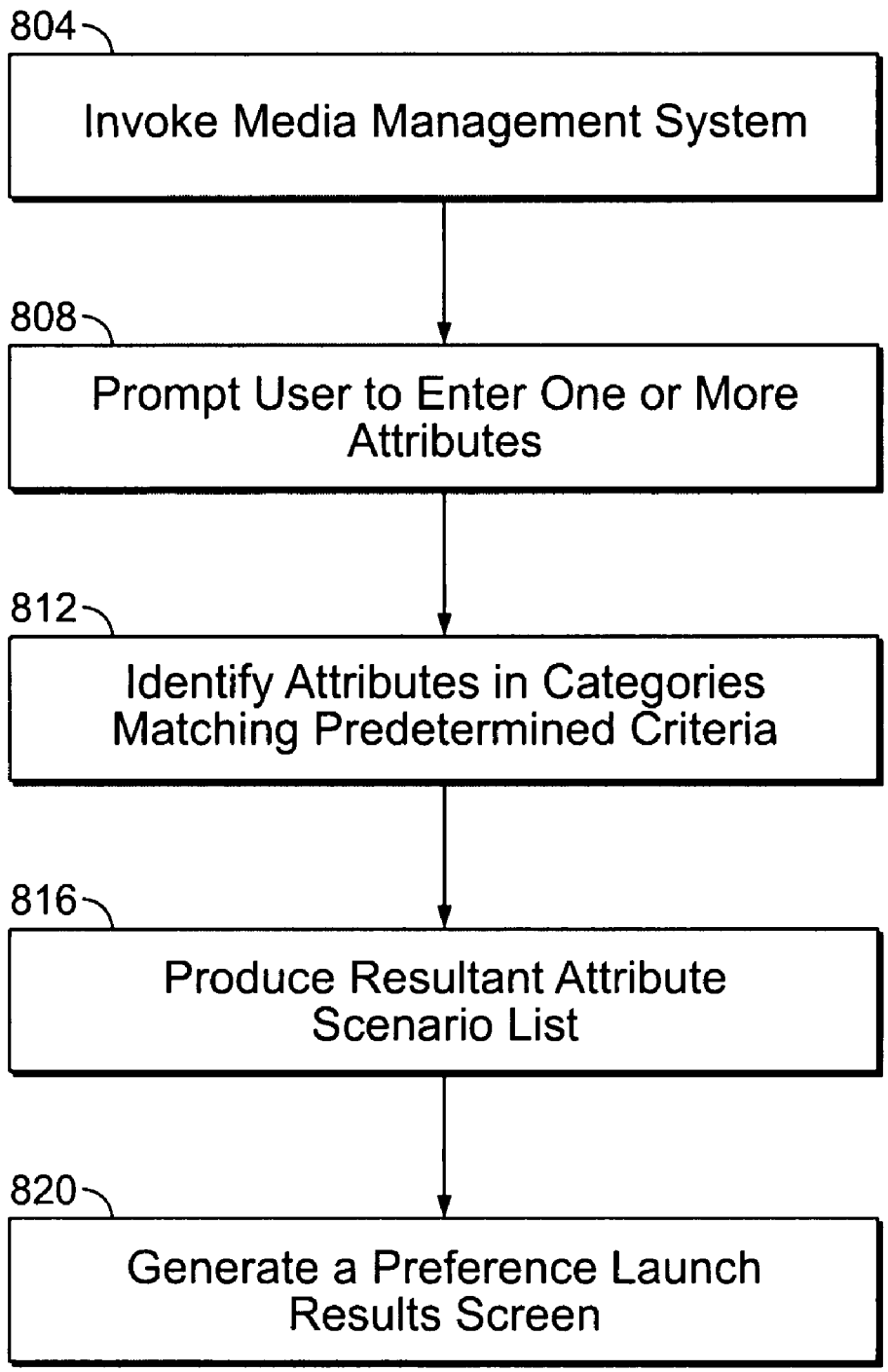
FIG. 8 shows a flow chart illustrating the steps of the system according to an embodiment of the present invention.

The operation of further embodiments of the present invention will now be further described with reference to FIG. 8.

Flowchart 800 illustrates one manner in which a user interacts with media management system 100 via user interface 115 to search the media database using email target contact information to obtain a resultant revenue list.

Flowchart 800 begins with step 804. In step 804, the user invokes media management system 100 in any operable manner, such as selecting an icon on a GUI of the user interface 102. In an embodiment, step 804 may also include steps for authenticating the user and verifying authorized access to system 100.

In step 808, media management system 100 displays on a portion of a user interface, a main screen. Main screen may include one or more preference search entry windows to allow a user to enter one or attributes to run the model. In the present example, the user is prompted for one or more attributes. For example, a user may enter a country "music video" for distribution that meet a revenue figure of at least 10,000,000 dollars. Thus, the search will determine possible scenarios of interest that indicate highest value for this particular piece of content and revenue criterion. These scenarios will include markets, demographics and geographies that maximize revenue, profits or some other financial indicator.

Referring again to FIG. 8, in step 812, the user submits the prospective attributes to be entered into the media management system. In the present example, the user is able to enter between 1 and X.

Media management module 104 controller next searches media database 106 for attributes in the categories of distribution, market, demographics and geographies that match certain predetermined criteria (Step 812). For example, it may be that only certain attributes will have preference flags that match with the type of content and/or source of content, in this case, "music video."

In step 816, the prospective attribute identifiers in each category and their associated preference flags are used to produce a resultant attribute scenario list.

In step 820, the media management module 104 generates a preference search results screen. For example, preference search results screen may be displayed in a spreadsheet format. In yet another embodiment, preference search results screen is displayed in a text file format.

At this point, the user may either eliminate certain of the potential attributes that are included in the list or respond to a prompt to run the media management programs to determine those scenarios that produce over the predetermined input figure of 10,000,000 dollars.

4.0 Targeted Advertising and Marketing Services

One of skill in the art will appreciate most successful advertising and marketing campaigns are typically those that are directed to the prospective consumers most likely to be interested in the product or services being offered.

In an embodiment of the invention, the user may submit a preference search for a targeted category of people by selecting one or more demographic attributes in order to determine the most profitable scenario in which to provide content to the particular class of users, thereby providing a content vehicle around which advertising or subscriptions can be sold. For example, the user may execute a search for content targets that would appeal to consumers who have a household income over fifty thousand dollars, and enjoy sports. Once the search is submitted, media management system 100 will execute the search and generate a preference search results screen, according to the methods described above.

5.0 Exemplary Rule Based Optimizer

In another embodiment of the invention, a set of rules may be provided in a rule based system to filter available content, select the most likely content to create value through a particular distribution arrangement, deliver either a list of those content items and/or the actual files containing that content to internal or external editors or to the distribution point itself. One of skill in the art will appreciate this rule based system can operate on a "constant scan" basis as each new content item is submitted to inventory, or it can be used "in retrospect" to search inventory for materials that had been stored earlier, or it can "constant scan" and when finding a new element, seek previously stored elements and deliver both new and old material to the Content Composer which may include a human editor function.

Figure 9:
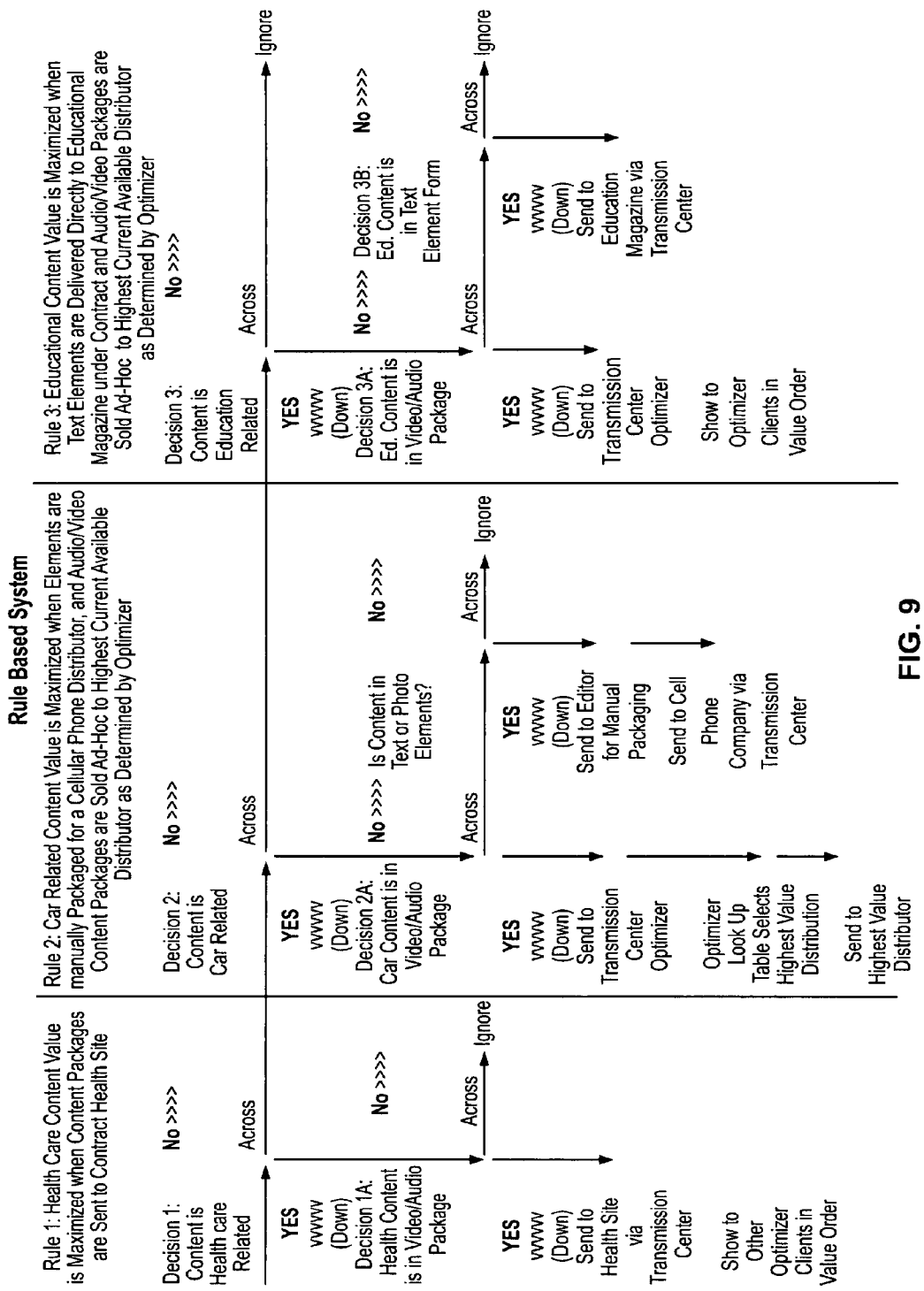
FIG. 9 shows an example of three content packages arriving at a content distribution optimizer according to an embodiment of the present invention.
Figure 13:
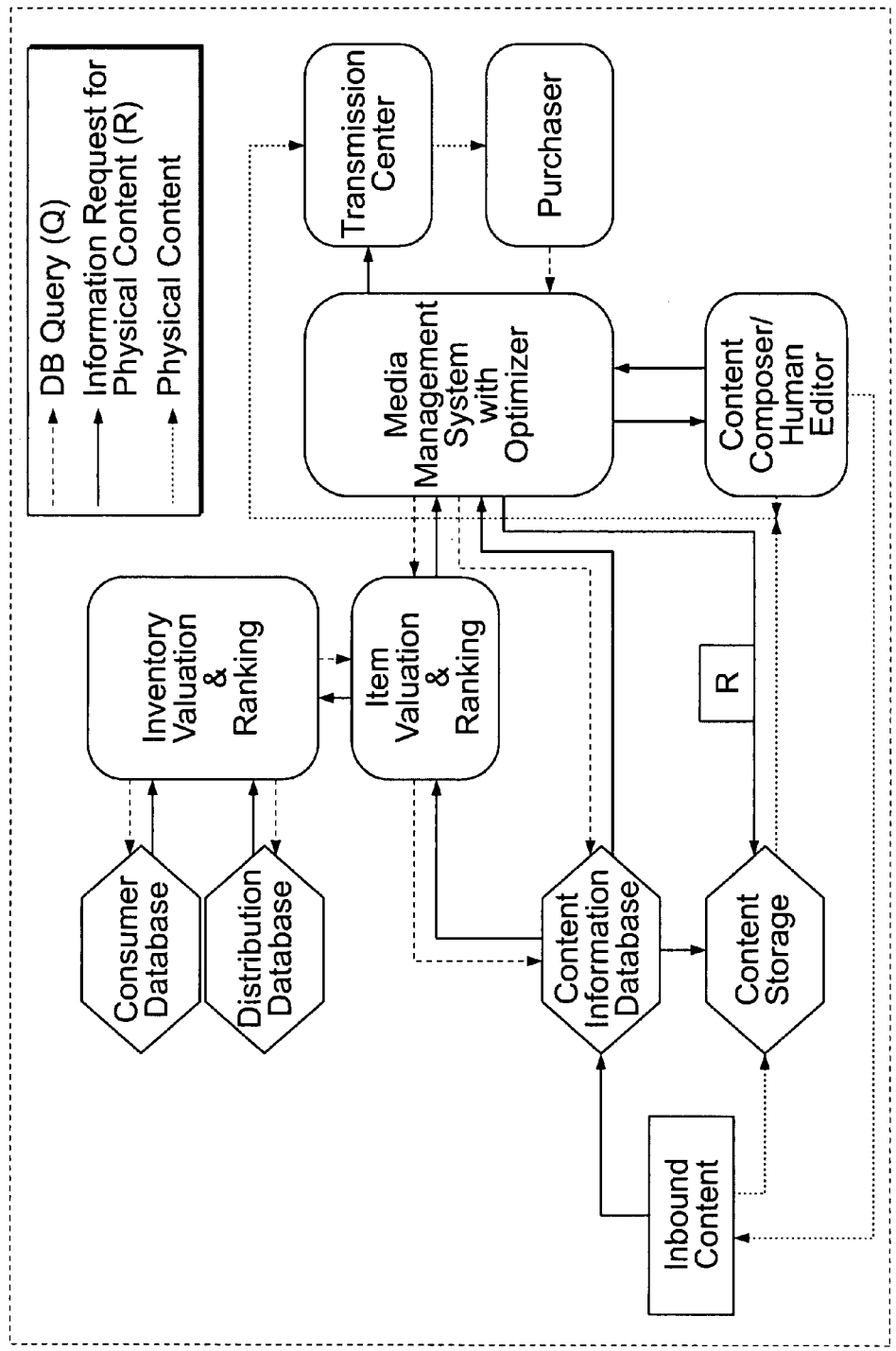
FIG. 13 shows a media management system with an optimizer according to an embodiment of the present invention.

In one aspect, content meeting designated subject and/or production criteria can be delivered to a "content distribution optimizer" (The Optimizer), shown in FIG. 13, within the Media Management System 100 or similar system, which can be used to match material to a value-creating distribution method (preferably the highest value-creating distribution method). One example depicted in FIG. 9 has three content packages arriving at the "content distribution optimizer," one video/audio content package on health, one still photograph and text package on customized cars, and a third text and photograph package on new educational techniques for middle school social studies. The Optimizer, based on previously established rules reflecting current market conditions, would direct the health package to the outside health web site, would direct the customized cars materials to the cellular telephone provider, and would submit the educational piece to an educational magazine. Such rules could be dynamically changed on a bid-system as distributors of media which are in need of certain types of content report they have increased what they are now paying for a specific type of content. The Optimizer receives that new pricing information, compares it with other pricing information from the current distributor, and routes the content to the new distributor if that entity is willing to pay more. If there are no expressions of interest at one point, but later a query is made by a distribution organization looking for material to meet a specific need, then the Optimizer routes that search request into the Content Information Database to determine if such material is available.

FIG. 10 provides illustrations of examples of how the rule based system and Optimizer could work under certain conditions. For example, as shown in FIG. 10, research and business deals may have been established that determine that health-related content dealing with subjects of interest to women 25-54 years of age provides the most incremental value when first placed on a health-related web site under a contract with the site operator. Further, experience may have established that audio/video content packages complete with reporter are the least expensive to adapt for sale to the Internet. This could be used to establish a rule for the initial secondary distribution of health care material targeted for women 25-54: Health Care Content Value is Maximized when Content Packages Are Sent to Contract Health Site first. Therefore, when a company owned television station in Chicago produces a news program segment on a new diagnosis technique for breast cancer, and information on that content package is entered into the Content Information Database, the rule based system immediately recognizes first the health related topic, and second the content package, and then automatically routes the information about the story and content file itself to the editors at the appropriate web site, or, if desired by the site's owners, publishes the material directly to the web along with associated text and identifying data. Since the contract for health related material, used in this example, is exclusive only for distribution on the Internet distribution medium, the information on the same content material is sent to the "Content Optimizer," which determines, in order of value, to what other non-internet distribution organizations the same content should be made available.

In a second example, as similarly shown in FIG. 10, it may be known through research that photographs and textual material on the subject of customized automobiles is popular on cellular telephones among men 18-34, and a contract exists between the content company and a cellular telephone company for such material. However, since such material often arrives in small elements, it needs to be assembled by an editor (Content Composer). There is sufficient payment in the cellular contract to pay for this editing. In addition, because the contract with the cellular telephone company is not exclusive except as regards to other cellular telephone companies, video/audio packages can be sold to any other distributor interested in making the purchase. This could result in Rule 2: Car Related Content Value is Maximized when Elements Are manually Packaged for a Cellular Phone Distributor, AND Audio/Video Content Packages Are Sold Ad-Hoc to Highest Current Available Distributor As Determined by Optimizer. Therefore, when new material enters the database, photos and text will be located and routed to the human editor at the Content Creator for preparation into a text and still picture package to be forwarded to the cellular provider, while video/audio packages in the same subject would be sent to the Optimizer to determine where the most value could be created, and subsequently shown to those distribution or aggregating organizations.

One of skill in the art would appreciate an additional rule set can be implemented to handle completed programs or publications, and route them either to a distribution vehicle known to maximize value, or to the appropriate sales group for one off, negotiated sale to distributors. For example, a half hour program on a business issue may automatically fall under a contract to be delivered to a national cable business network, in which case the rule based system would deliver that program as soon as it was entered into the system. However, the database may not indicate the availability of an immediate recipient of the new content. In this instance, the rule based system, under previous instructions, would deliver that content to a human sales team which would market the content using conventional methods.

Figure 11A:
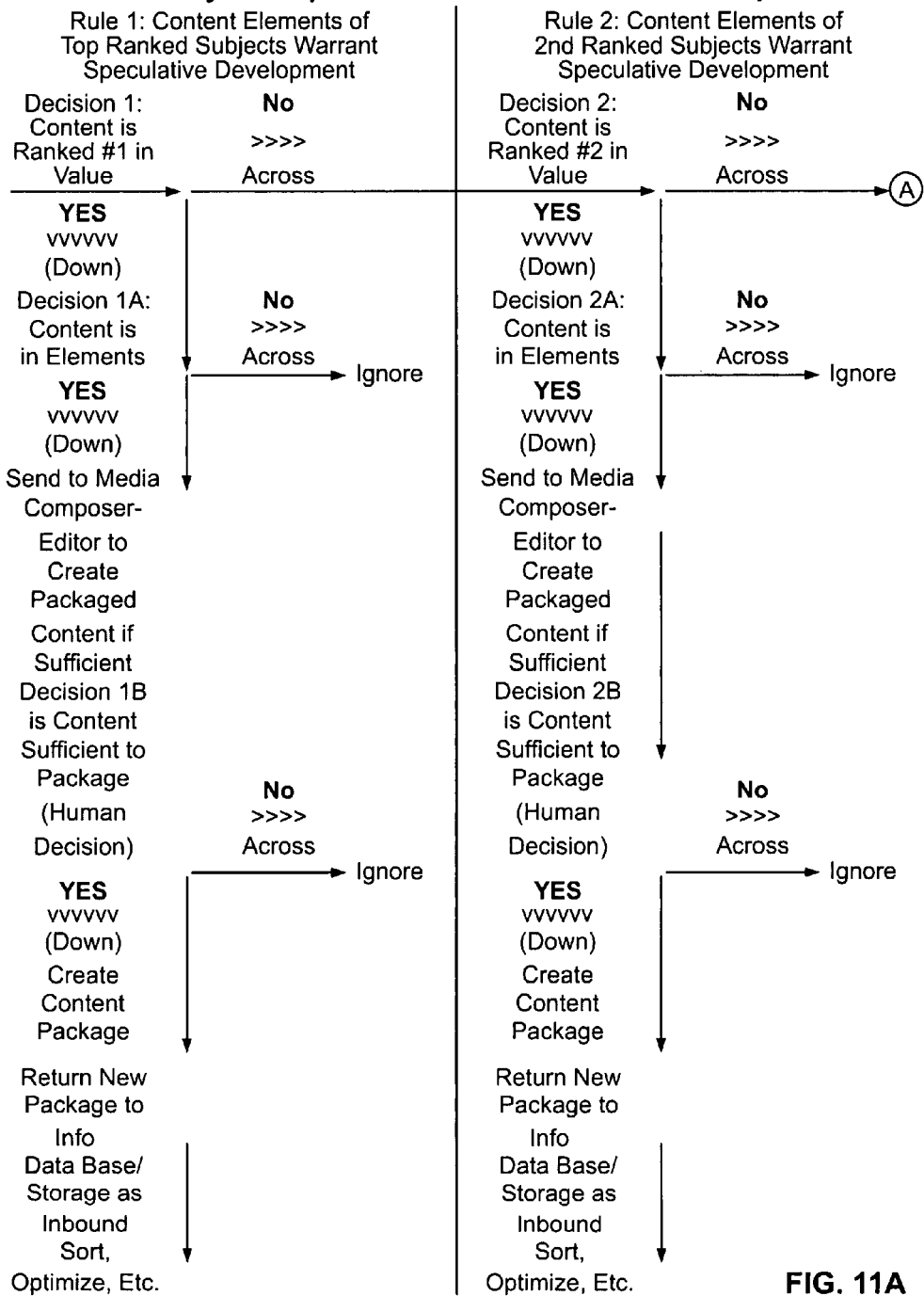
FIGS. 11A & 11B depict an exemplary rule for development of material on speculation for future sale according to an embodiment of the present invention.
Figure 11B:
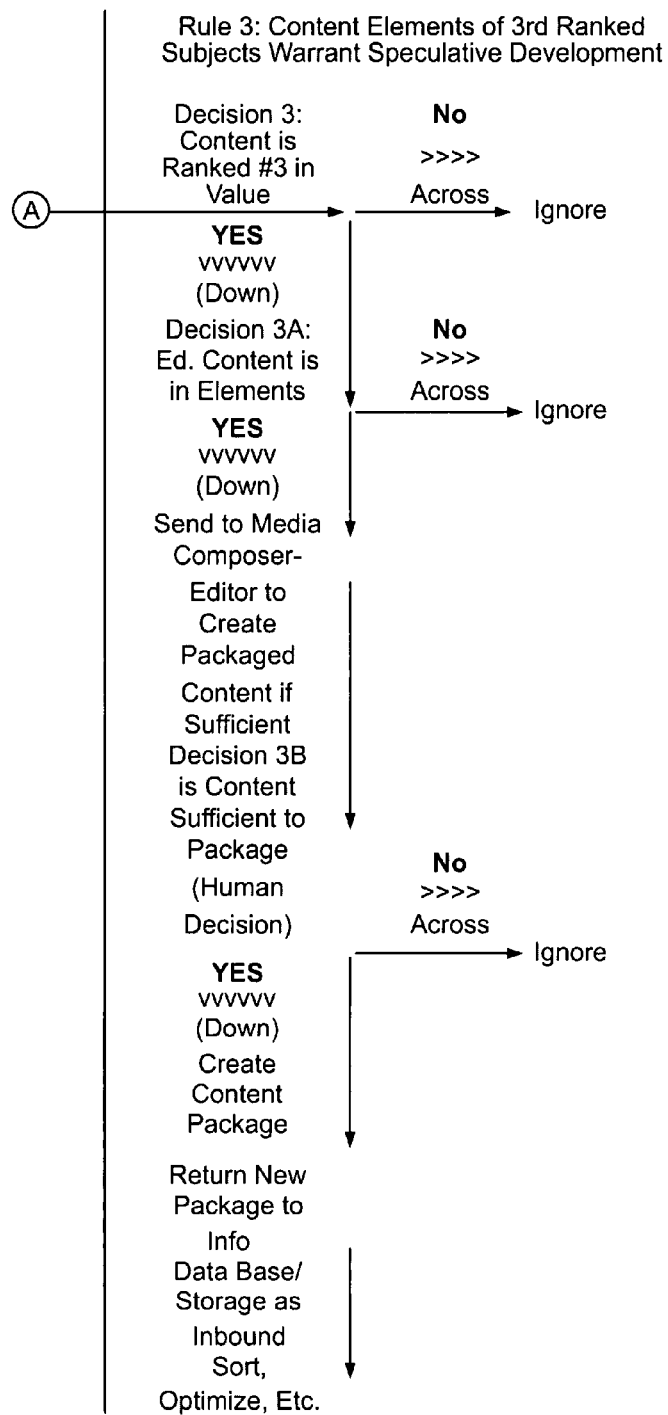

An additional rule set can also provide a foundation for development of material on speculation for future sale. One such rule set is depicted in FIG. 11. Referring to Step 820 of FIG. 8, the media management module 104 generates a preference search results screen. Content material identified in Step 820 is sent to the editor (Content Composer) for preparation into completed packages, on a speculative basis, which are then inventoried and retained for the prospect of later sale.

In yet another embodiment, an external purchaser or aggregator of content (such as a web site, a cellular telephone company, or a television company) could query the Optimizer regarding content with specific characteristics then needed by the distribution company or content aggregator. For example, the distribution company may have discovered that it is short on health material for its health web site, or the aggregator may be trying to build up its access to animated cartoons. If the requested content were then immediately available, the Optimizer could advise the external purchaser of the price, setting the price by rule at a percentage above the price of the most recent purchaser. If the content requested by the outside entity was not available immediately, the Optimizer could query the content information database to determine whether the requested content was available in inventory, and, if so, make such content available to the outside entity. Such requests by an outside entity could have the same criteria as an internal request, with rules established to determine what could be sold without review, versus what content would need an internal editorial and/or legal review before it would be sold.

While various embodiments of the present invention have been described above, it should be understood that they have been presented by way of example only and not limitation. For example, FIGS. 12A & B show information that may be added to facilitate one or more of the processing functions described in the embodiments above (e.g., the information shown in FIG. 6). Yet, it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of determining media attribute selections using an inventory of media attributes stored in a database, comprising:
   storing at least one content producing resource in the database;
   storing distribution forms in the database;
   storing demographic sectors in the database;
   storing geographies of interest in the database;
   mapping media content to distribution forms, demographic sectors, and geographies of interest to determine scenarios of interest; and
   calculating revenue estimates associated with the scenarios of interest; and
   creating a resultant scenario list containing the scenarios of interest in rank order by revenue projection.

2. The method of claim 1, wherein content contains at least one of movies, video clips, print articles, audio clips, news programs, documentary programs, graphics, advertisements, music files, and enhanced media.

3. The method of claim 1, wherein content producing sources include at least one of television networks, movie studios television stations, radio stations, newspaper organizations, publishing house, and online content providers.

4. The method of claim 1, wherein distribution forms include at least one of video broadcast, audio broadcast, video cable, video satellite, video wireless, audio wireless, print publication, video Internet, audio Internet.

5. The method of claim 1, wherein demographic sectors include at least one of age, gender, education, income, and buying habits.

6. The method of claim 1, further comprising calculating projected costs associated with scenarios of interest.

7. The method of claim 6, further comprising determining net income associated with scenarios of interest.

8. The method of claim 6, further comprising determining operating cash flow associated with scenarios of interest.

9. The method of claim 1, wherein at least one content asset is provided with a preference flag.

10. The method of claim 1, wherein a plurality of attributes in different groups are provided with preference flags.

* * * * *